United States Patent
Zoraster et al.

(10) Patent No.: US 7,280,932 B2
(45) Date of Patent: Oct. 9, 2007

(54) METHOD, SYSTEMS, AND COMPUTER READABLE MEDIA FOR OPTIMIZING THE CORRELATION OF WELL LOG DATA USING DYNAMIC PROGRAMMING

(75) Inventors: Steven Zoraster, Austin, TX (US); Ramoj Kumar Paruchuri, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 0 days.

(21) Appl. No.: 10/935,623

(22) Filed: Sep. 7, 2004

(65) Prior Publication Data

US 2006/0052937 A1    Mar. 9, 2006

(51) Int. Cl.
*G01D 18/00* (2006.01)
(52) U.S. Cl. .......................................... 702/85; 702/14
(58) Field of Classification Search .................. 702/85, 702/14, 13, 10; 73/152.02
See application file for complete search history.

(56) References Cited

U.S. PATENT DOCUMENTS

| | | | | |
|---|---|---|---|---|
| 4,541,275 A | * | 9/1985 | Kerzner | 73/152.02 |
| 5,105,356 A | * | 4/1992 | Maute et al. | 702/10 |
| 6,012,017 A | * | 1/2000 | Van Bemmel et al. | 702/14 |
| 2004/0204858 A1 | * | 10/2004 | Brumbaugh | 702/13 |

* cited by examiner

*Primary Examiner*—Bryan Bui
*Assistant Examiner*—Xiuqin Sun
(74) *Attorney, Agent, or Firm*—Merchant & Gould

(57) ABSTRACT

A method, systems, and computer readable media optimize the correlation of well log data utilizing dynamic programming. A geological signature in well log data from a reference well is mapped onto well log data from one or more target wells by using a dynamic programming algorithm to calculate multiple solutions. Each calculated solution has an associated cost measure with the least cost measure representing the optimal solution. Each solution represents a mapping of the geological signature from reference well log data onto the target well log data. The optimal solution and may be displayed to a user along with the location of well picks mapped from the reference well log data. The user may either accept the displayed calculated solution or choose one of the alternative solutions. The user may also ignore the calculated solutions and manually select a different solution or add constraints to a calculated solution.

30 Claims, 9 Drawing Sheets

METHOD, SYSTEMS, AND COMPUTER READABLE MEDIA FOR OPTIMIZING THE CORRELATION OF WELL LOG DATA USING DYNAMIC PROGRAMMING

TECHNICAL FIELD

The present invention is related to the correlation of well log data. More particularly, the present invention is related to the use of dynamic programming to optimize the correlation of well log data from a reference well with well log data from one or more target wells by rendering a display consisting of a number of possible solutions representing varying levels of optimization for the well log data.

BACKGROUND

Well-to-well log correlation is a task often performed by geoscientists looking for consistency or change between patterns or signatures in well log data measured from sub-surface geological formations. A well log may be visually displayed as a curve representing the measurement of a rock property plotted against well depth. Since well log curve amplitude measurements generally vary depending on the type of rock and the amount of water, oil or gas within rocks, well logs are typically used to identify patterns or signatures indicative of naturally occurring compounds, such as hydrocarbons, at various depths in a well. Once a signature of interest (i.e., a continuous depth varying amplitude pattern) in a well log curve from a well has been identified, the signature, or a very similar depth varying amplitude pattern is then searched for in logs from nearby wells. Well-to-well log correlation is often useful in the petroleum industry where knowledge of the earth's sub-surface is necessary to efficiently find and extract oil reserves.

Historically, well log correlation was manually performed by an interpreter who visually compared paper "reference" well logs and "target" well logs to look for a particular signature (or similar variation thereof). This manual process was, in many cases, a time intensive task as the amplitude of the curves representing the target well logs would need to be visually stretched or squeezed for the interpreter to "find" the reference signature in the target well logs. In addition, if a large number of wells were being correlated, the task also became manpower intensive, as it required the visual inspection of each well log for the desired signature.

More recently, interactive computer implemented solutions have been developed which require the user to divide the signature from the reference well into intervals, optionally applying uniform stretching and squeezing of that interval, and use a workstation mouse to move each interval along the target well's track to find a good fit. These solutions, however, are potentially time intensive, and often offer little improvement over previous manual methods using paper logs.

In an effort to reduce the manpower and time traditionally required to correlate well log data, several alternative computer implemented solutions have been proposed to automate this task. However, these alternative solutions, which have included expert systems, neural networks, dynamic programming, combinations of expert systems and statistics, and combinations of expert systems and dynamic programming, have all been previously tried without success.

SUMMARY

Illustrative embodiments of the present invention address these issues and others by providing for optimizing the correlation of well log data in a user-controlled workflow. One illustrative embodiment identifies a geological signature in well log data from a reference well, identifies well log data from one or more target wells, and calculates solutions representing a mapping of the geological signature, from the reference well log data to a range of depths in the target well log data. Each of the solutions has an associated cost measure. The solutions may be calculated by utilizing a dynamic programming algorithm to determine the cost of an alignment between a connected subset of data elements comprising the geological signature in the reference well log data and a either a subset or totality of data elements comprising the target well log data. The illustrative embodiment further displays the solution having the least associated cost measure on the target well log data as an optimal solution, wherein the optimal solution comprises a mapping of the geological signature from the reference well log data. The target well log data may be displayed as a well log curve.

The illustrative embodiment may further display indicia representing each of the calculated plurality of solutions in order of increasing cost while voiding solutions which are near a starting location of a previously calculated solution on the target well curve. The illustrative embodiment may further identify a set of pick locations, corresponding to a plurality of depths in the reference well, on the geological signature from the reference well log data, map the set of pick locations onto each of the calculated solutions, and display the mapped set of pick locations corresponding to the optimal solution on the target well log curve.

The illustrative embodiment may further receive a user selection of a calculated solution from a group of calculated solutions to be displayed on the target well log curve and display the mapped set of pick locations corresponding to the selected solution on the target well log curve. The illustrative embodiment may further enable a user to interactively move the position of a calculated solution desired for display along the target well curve while automatically remapping the set of pick locations when the solution is moved. The illustrative embodiment may further receive a user selection of constraint data which forces the plurality of solutions to align a plurality of identified depths along the geological signature from the reference well to a plurality of selected depths along the mapped geological signature. The user may select the constraint data by pointing to and clicking on one or more depths along the reference well and target well log curves.

Other illustrative embodiments of the invention may also be implemented in a computer system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

DETAILED DESCRIPTION

Illustrative embodiments of the present invention provide for optimizing the correlation of well log data in a user-controlled workflow. The illustrative embodiments of the present invention are implemented as logical processing operations that are performed on well log data. The optimization of the well log correlation and the calculation and display of optimal solutions may result from the execution of program modules on a conventional computer system, described below with reference to FIG. 1, or from the execution of hard-wired special purpose digital logic or other processing devices and systems. Accordingly, while the discussion below relates to the use of program modules on a conventional computer system such as shown in FIG. 1, it will be appreciated that this discussion is for purposes of example and is not intended to be limiting.

Figure 1:
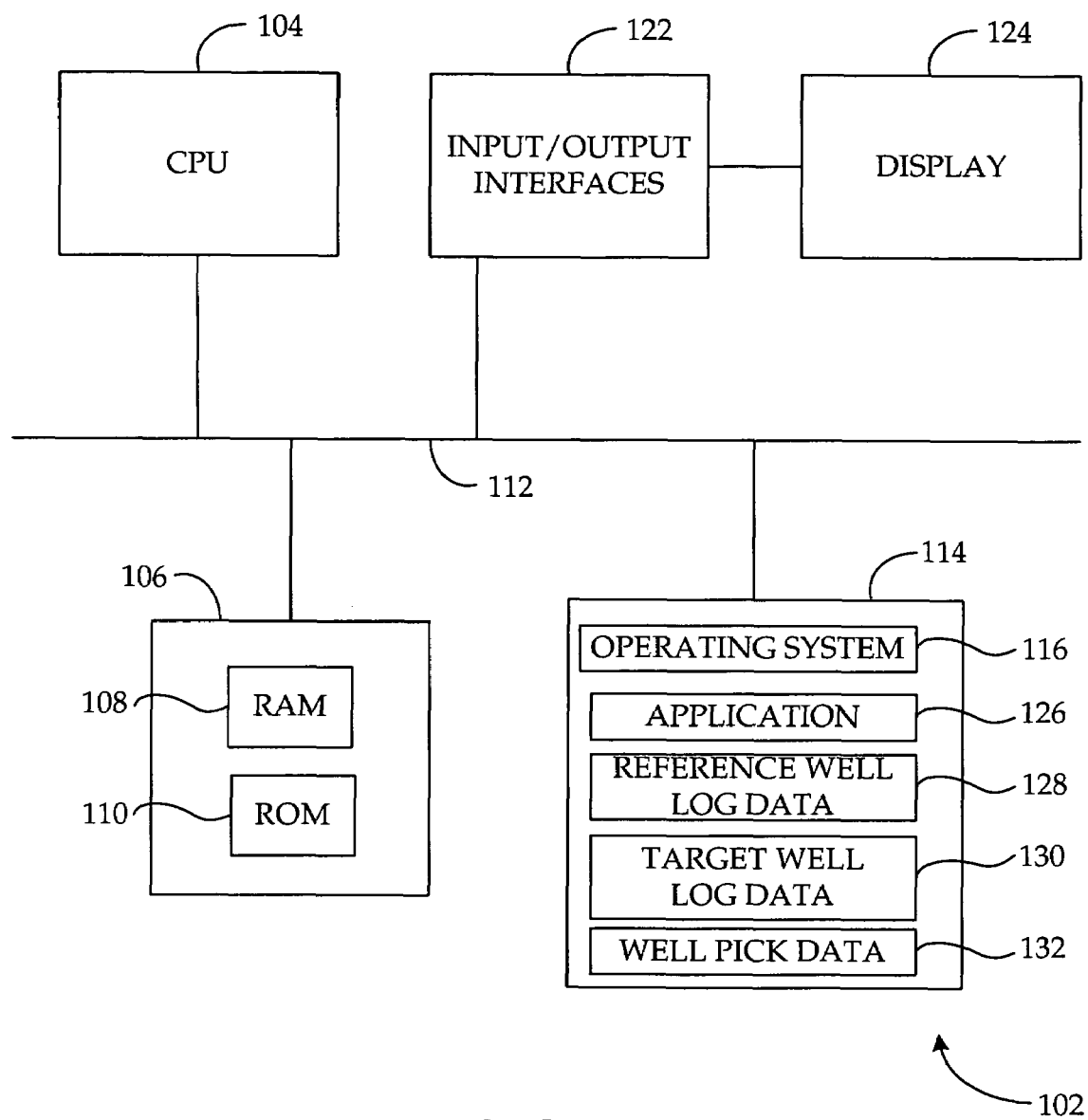
FIG. 1 shows a typical computer system operating environment for illustrative embodiments of the present invention.

FIG. 1 and the following discussion are intended to provide a brief, general description of a suitable computer system environment in which the invention may be implemented. While the invention will be described in the general context of program modules that execute in conjunction with application programs that run on an operating system on a personal computer, those skilled in the art will recognize that the invention may also be implemented in combination with other program modules. Generally, program modules include routines, programs, components, data structures, and other types of structures that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention as applied to the personal computer of FIG. 1 may also be practiced in distributed computing environments where tasks are performed by remote processing devices that are linked through a communications network. In a distributed computing environment, program modules may be located in both local and remote memory storage devices.

FIG. 1 shows an illustrative computer architecture for a personal computer 102 for practicing the various embodiments of the invention. The computer architecture shown in FIG. 1 illustrates a conventional personal computer, including a central processing unit 104 ("CPU"), a system memory 106, including a random access memory 108 ("RAM") and a read-only memory ("ROM") 110, and a system bus 112 that couples the memory to the CPU 104. A basic input/output system containing the basic routines that help to transfer information between elements within the computer, such as during startup, is stored in the ROM 110. The personal computer 102 further includes a mass storage device 114 for storing an operating system 116 and application programs, such as the application program 126 that is utilized for optimizing the correlation of well log data according to the various illustrative embodiments of the invention. The mass storage device 114 may also store the reference well log data 128, the target well log data 130, and the well pick data 132 which is utilized by the application program 126 as described in detail below with respect to the logical operations of FIGS. 2A–2C.

The mass storage device 114 is connected to the CPU 104 through a mass storage controller (not shown) connected to the bus 112. The mass storage device 114 and its associated computer-readable media, provide non-volatile storage for the personal computer 102. Although the description of computer-readable media contained herein refers to a mass storage device, such as a hard disk or CD-ROM drive, it should be appreciated by those skilled in the art that computer-readable media can be any available media that can be accessed by the personal computer 102.

By way of example, and not limitation, computer-readable media may comprise computer storage media and communication media. Computer storage media include volatile and non-volatile, removable and non-removable media implemented in any method or technology for storage of information such as computer-readable instructions, data structures, program modules or other data. Computer storage media include, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above should also be included within the scope of computer-readable media. Computer-readable media may also be referred to as computer program product.

The personal computer 102 of FIG. 1 may also include input/output controller interfaces 122 for receiving and processing input from a number of devices, including a keyboard or mouse (not shown). Similarly, the input/output controller interfaces 122 may provide output to a display screen 124, a printer, or other type of output device. Such output may include a reference well curve and optimized target well curves such as those created by the logical operations of FIGS. 2A–2C and shown in FIGS. 3–7, below.

As mentioned briefly above, a number of program modules and data files may be stored in the mass storage device 114 and RAM 108 of the personal computer 102, including an operating system 116 suitable for controlling the operation of a stand-alone personal computer. The mass storage device 114 and the RAM 108 may also store one or more application programs such as the application 126 that optimizes the correlation of well log data. Illustrative embodiments of the present invention provide program modules for use in conjunction with the application program 126. The program modules may implement logical operations such as those of FIGS. 2A–2C to create optimized target well log curves by calculating optimized solutions from input reference and target well log data and to enable user interaction for editing the optimized solutions.

Figure 2A:
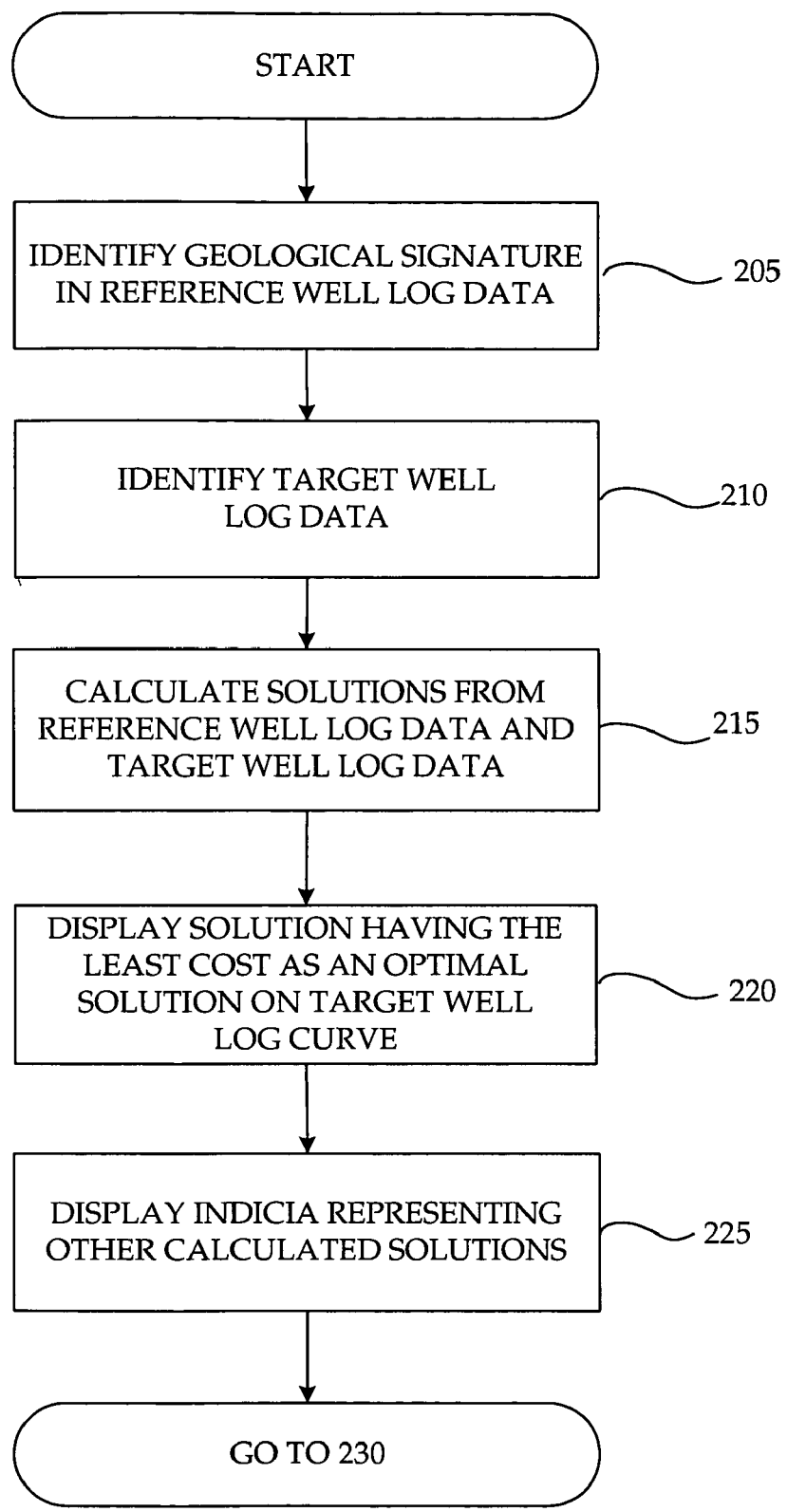
FIG. 2A shows the logical operations performed by an illustrative embodiment to calculate solutions representing mapped geological signatures for display on one or more target well log curves.
Figure 2B:
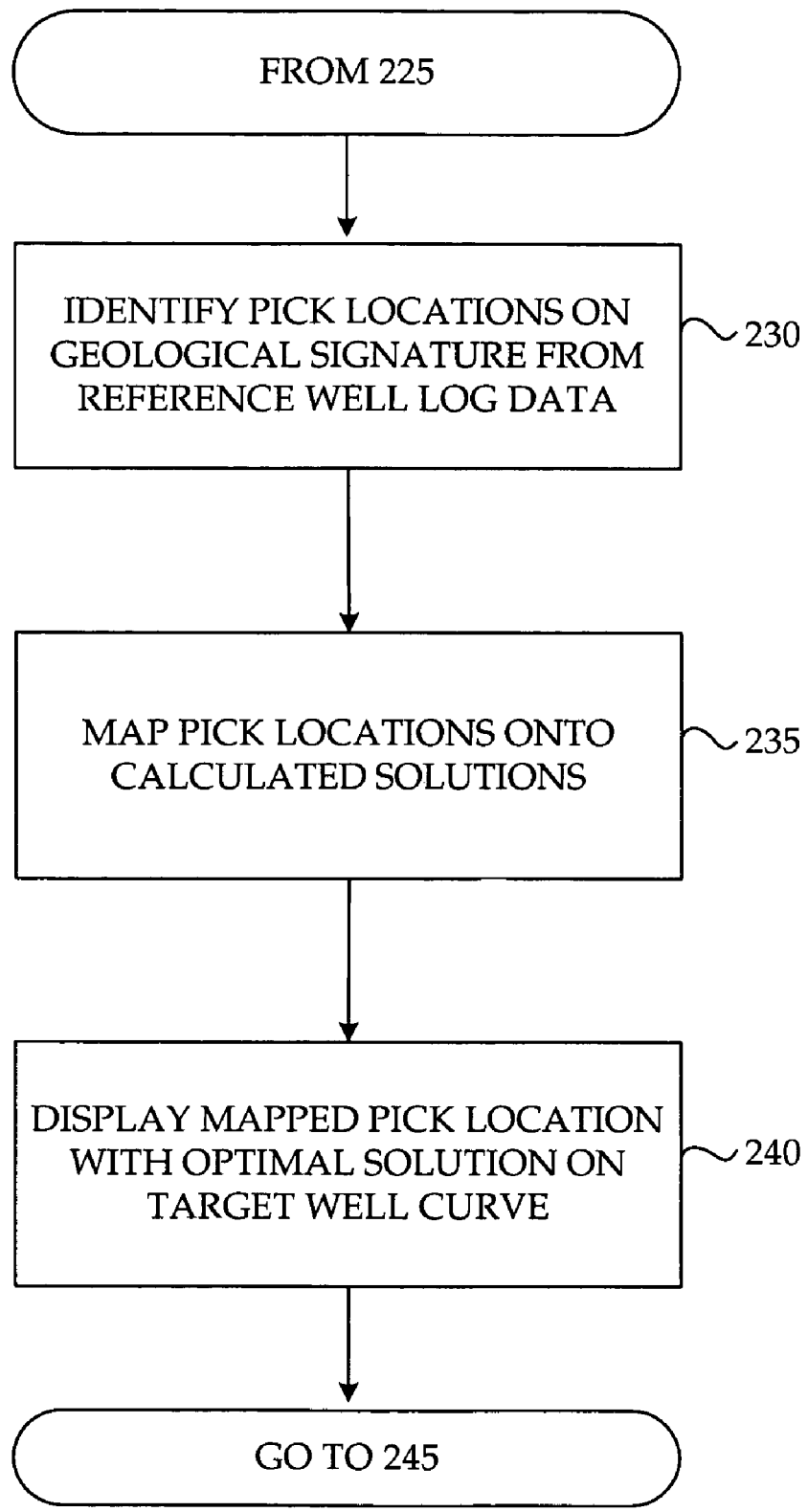
FIG. 2B shows the logical operations performed by an illustrative embodiment to map and display well pick locations onto the calculated solutions displayed on a target well log curve.
Figure 2C:
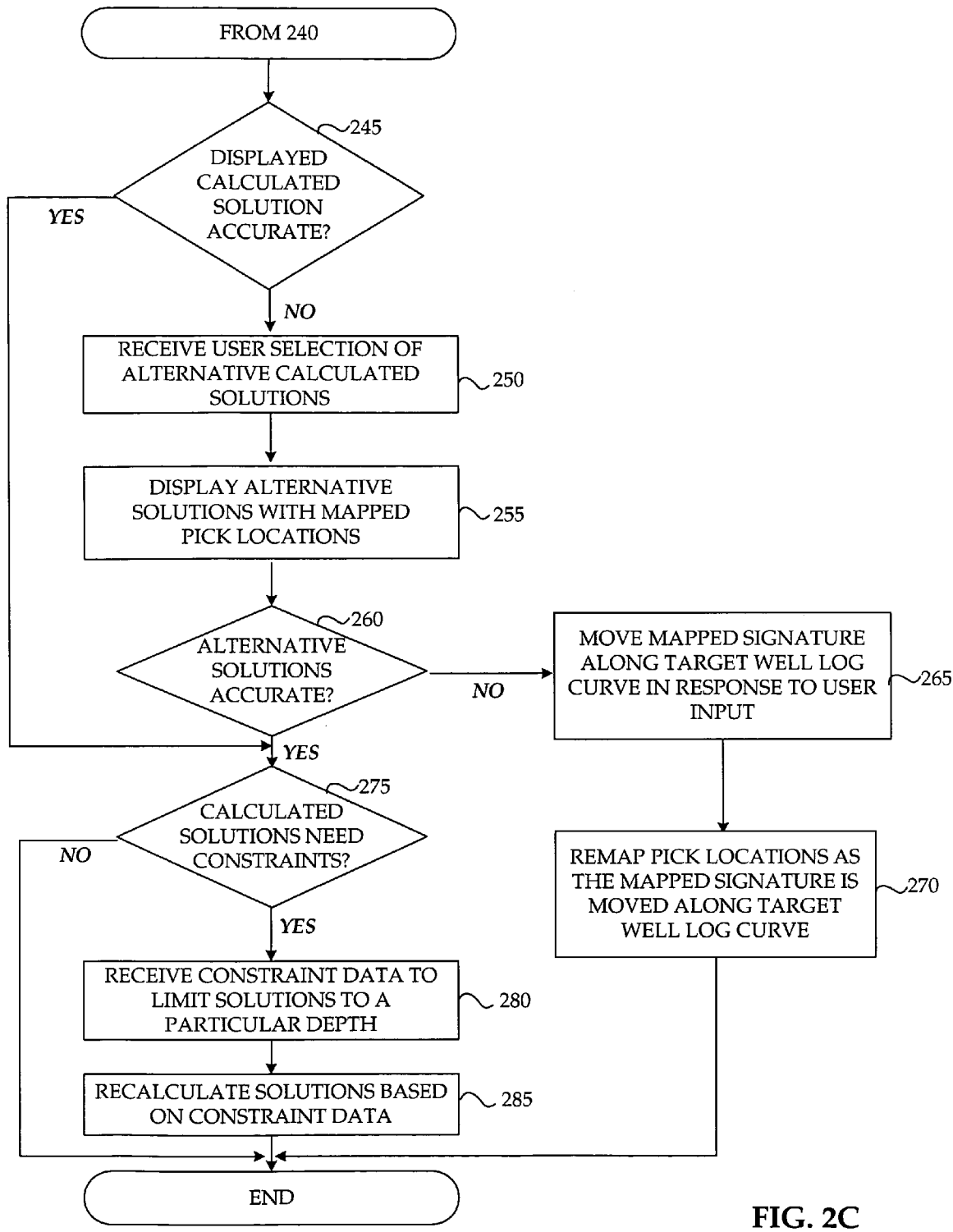
FIG. 2C shows the logical operations performed by an illustrative embodiment to select alternative calculated solutions, manually select a solution, and constrain calculated solutions for display on a target well log curve.

Referring now to FIGS. 2A–2C, illustrative logical operations or routines will be described illustrating a process for optimizing the correlation of well log data. When reading the discussion of the illustrative routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIGS. 2A–2C, and making up illustrative embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 3:
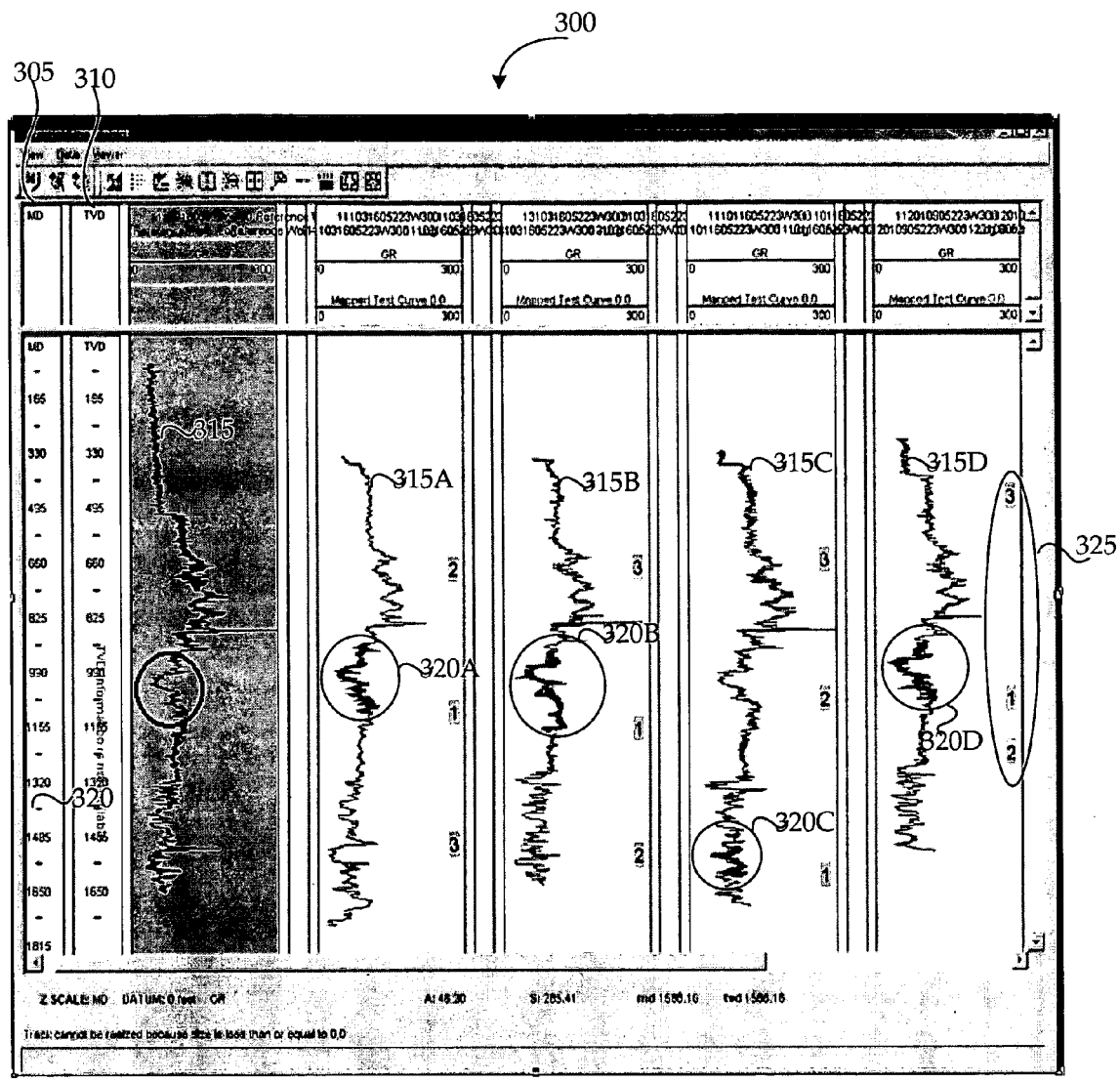
FIG. 3 shows a computer generated display of a geological signature from a reference well log curve mapped on multiple target well log curves, according to an illustrative embodiment.

Referring now to FIG. 2A, an illustrative routine performed by a processing device, such as the processor 104 of the computer system of FIG. 1 will be described for calculating optimized solutions for mapping a geological signature from reference well log data onto well log data from one or more target wells. An example of well log data that includes a geological signature is shown in FIG. 3. As can be seen, a display 300 generated by the application program 126 includes reference well log data represented as reference well log curve 315. The target well log curve 315 further includes a geological signature 320 (shown in the encircled area on the curve. The display 300 also includes target well log data from four wells which are represented as target well log curves 315A, 315B, 315C, and 315D respectively.

Returning now to FIG. 2A, the routine begins at operation 205 where the application program 126 executed by the processor 102 accesses the reference well log data 128 from the mass storage device 114 to identify the geological signature to be correlated onto one or more target wells. The logical operations then continue from operation 205 to operation 210 where the application program 126 accesses the target well log data 130. It will be appreciated that the target well log data 130 may contain well log data from one or multiple target wells which need to be correlated.

The logical operations then continue from operation 210 to operation 215 where the application program 126 calculates possible solutions from the reference well log data 128 and the target well log data 130. In particular, the application program 126 determines an alignment between a connected subset of data elements making up the geological signature in the reference well log data 128 and either a subset or totality of data elements making up the target well log data 130. Those skilled in the art will appreciate that the logical operation 215 may be implemented utilizing a dynamic programming algorithm. In particular, the dynamic programming algorithm may be a dynamic time warping ("DTW") algorithm, which may be utilized for data mining and signal processing operations, adapted for use on depth sampled well log data. A dynamic programming algorithm which may be utilized in various illustrative embodiments of the invention will now be described.

As known to those skilled in the art, dynamic programming is an algorithmic technique that solves optimization problems involving sequential decision-making by caching subproblem solutions rather than repeatedly recomputing them. In the presently described dynamic programming algorithm, depth-sampled well log curves are sampled into data series. For instance, well log data from two wells (a reference well and a target well) may be sampled to resemble time series data Q and R of length N and M respectively, where:

$Q = q_1, q_2, q_3, q_4, \ldots, q_M$ $R = r_1, r_2, r_3, r_4, \ldots, r_N$

The algorithm aligns the two data series by associating all ordered samples in the first series with all ordered samples of the second. Each individual pairwise association has a cost or distance measure $d_{ij}$. To align the sequences Q and R using dynamic programming, an M×N matrix D (ordered from left to right and top to bottom) may be constructed where the matrix element (i,j) contains the distance $d(q_i, r_j)$ between the two points $q_i$ and $r_j$. An alignment is any connected path through D from the lower right of the matrix at entry (M,N) back to entry (1,1) at the upper left of the matrix where movement from element (i,j) is allowed only to elements (i−1,j), (i,j−1), or (i−1,j−1) in the matrix. The connected path may be found by constructing a new M×N matrix C (i.e., a cost matrix), where each element corresponds to the cost equation:

$$C(i,j) = d(q_i, r_j) + \min[C(i-1,j), C(i,j-1), C(i-1,j-1)].$$

In its final form, C is a matrix of accumulated, optimized sum of distances on the least cost path from element (i,j) back to element (1,1). Those skilled in the art will appreciate that the results stored in the individual elements of C, along with information about the path back to (1,1) are the cached subproblem solutions in this implementation of a dynamic programming algorithm. To recover the optimal return path before building C an M×N matrix B (i.e., a backtrack matrix) may be constructed of byte size elements that records at (i,j) which of the three choices was made in solving the cost equation shown above.

Utilizing the dynamic programming algorithm described above, the calculation of the possible solutions from the reference well log data 128 and the target well log data 130 performed at operation 215 may include aligning depth sampled data elements from the reference well log data 130 comprising a geological signature or motif of interest with the data elements comprising the target well log data 130. In other words, each calculated solution will incorporate a connected subset of data elements comprising the geological signature from the reference well log data and a either a subset of totality of data elements comprising the target well log data. In calculating the optimal solution, the application program 126 may construct the cost and backtrack matrices described above to find a least cost path between the data elements. It will be appreciated that in one illustrative embodiment, prior to constructing the cost matrix C, a D matrix such as the one discussed above may be created with an extra column populated with "zero" distance (i.e., $d_{k,0}=0.0$) to encourage motif mapping solutions paths to reach the left side of the C matrix before eventually reaching element (0,0).

Thus, the optimal calculated solution represents a "mapping" of the geological signature from the reference well data onto the target well data having the least cost or distance measure. The application program 126 may also utilize the aforementioned dynamic programming algorithm to calculate additional solutions or mappings in order of increasing cost. For instance, the next best solution or "mapping" of the geological signature from the reference well data onto the target well data is a solution of the cost matrix C having the second lowest cost path between the data elements.

It will be appreciated that the application program 126 may be configured to avoid the calculation of "trivial" matches when utilizing the dynamic programming algorithm to calculate multiple solutions. Trivial matches are solutions starting near the same location on a target curve and which follow almost the same path through the cost matrix used to solve for optimization. In one illustrative embodiment, the application program 126 may avoid trivial matches by voiding any solution of the cost matrix which begins within one-half of the length of the input geological signature or motif from the reference well log data.

Following operation 215, the routine then continues at operation 220 where the application program 126 displays the calculated solution having the least cost measure as the optimal solution on the target well log curve. In particular, the application program 126 maps the calculated solution in which the geological signature from the reference well log curve "best fits" the target well log curve. For instance, as shown in FIG. 3, the display 300 shows the calculated optimal mappings of the reference well log signature 320 (shown as 320A, 320B, 320C, and 320D) on the target well log curves 315A–315D.

The routine then continues from operation 220 at operation 225 where the application program 126 displays indicia, such as the ordinal numbers 325 shown encircled in FIG. 3, representing the other calculated solutions on the target well log curves. In particular, it will be appreciated that the ordinal numbers 325 may represent a ranking of the accuracy of the calculated solutions shown on the target well log curves 315A–315D. For instance, the ordinal number "1" shown next to the mappings 320A–320D represent the least cost solution, while the ordinal numbers "2" and "3" shown next to the target well curves 315A–315D represent the second and third calculated least cost solutions, respectively. It will be appreciated that while the mappings not corresponding to the optimal solution are not initially displayed on the target well log curves shown in FIG. 3, they may be subsequently displayed by a user selecting the displayed indicia shown next to the displayed log curves, as will be more fully discussed below in the description of FIG. 2C. The routine continues from operation 225 at operation 230 which will be immediately discussed below in the description of FIG. 2B.

Referring now to FIG. 2B, the routine continues from operation 225 at operation 230 where the application program 126 accesses the well pick data 132 stored on the mass storage device 114 for the reference well log data 128 to identify pick locations. As known to those skilled in the art, geoscientists often insert "picks" on reference well logs to indicate the locations of changes in the physical properties of sub-surface geological formations (e.g., a transition from shale to sandstone). The routine then continues from operation 230 at operation 235 where the application program 126 maps the pick locations onto the calculated solutions from operation 215. In mapping the pick locations, the application program 126 may utilize a backtrack matrix B constructed by the dynamic programming algorithm and retained in computer memory to determine where picks in reference well log data are mapped on target well log data.

Figure 4:
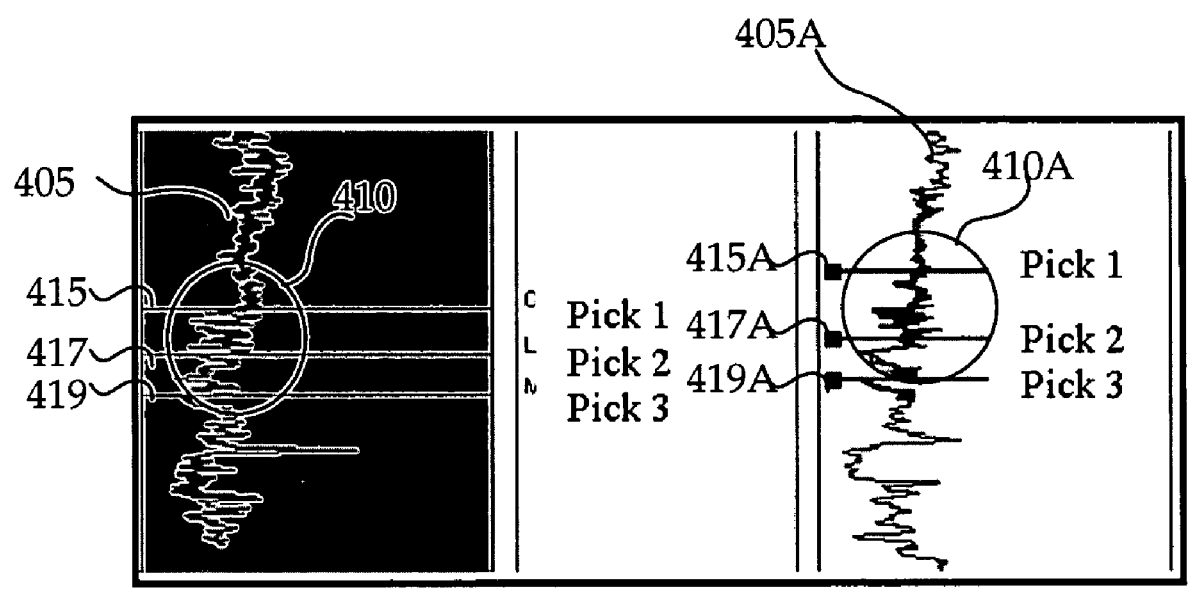
FIG. 4 shows a computer generated display of a geological signature with pick locations from a reference well log curve mapped on a target well log curve, according to an illustrative embodiment.

The routine then continues from operation 235 at operation 240 where the application program 126 displays the mapped pick locations along with the optimal solution for the geological signature on the target well log curve. For instance, FIG. 4 shows a display of a reference well log curve 405 having a geological signature 410 and well picks 415, 417, and 419. The target well log curve 410A shows a mapped geological signature 410A along with mapped well picks 415A, 417A, and 419A. It will be appreciated that the well picks for the reference well may have been selected prior to the execution of the dynamic programming algorithm. The routine continues from operation 240 at operation 245 which will be immediately discussed below in the description of FIG. 2C.

Figure 5A:
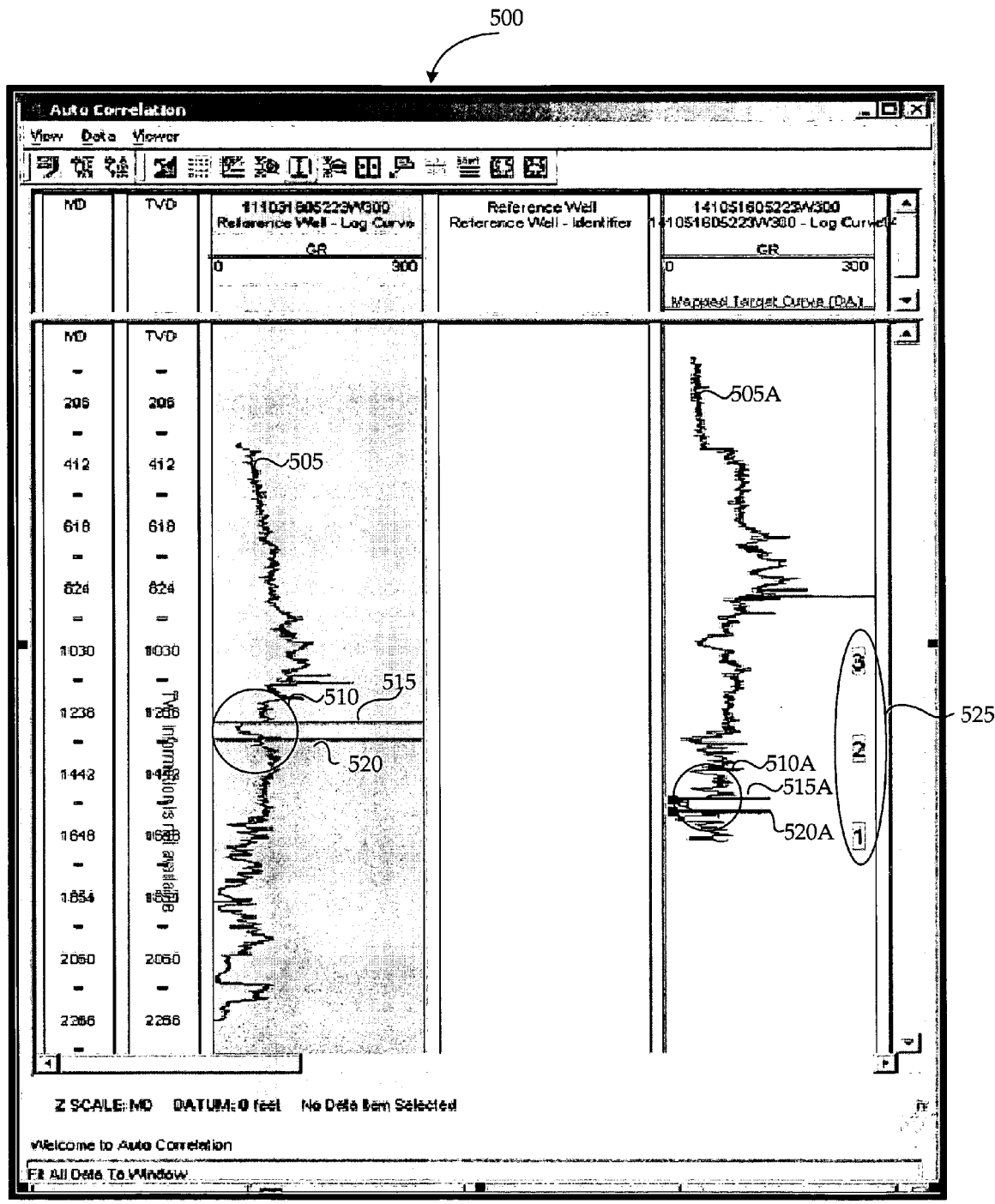
FIG. 5A shows a computer generated display of an optimal calculated solution on a target well log curve which is geologically inaccurate, according to an illustrative embodiment.
Figure 5B:
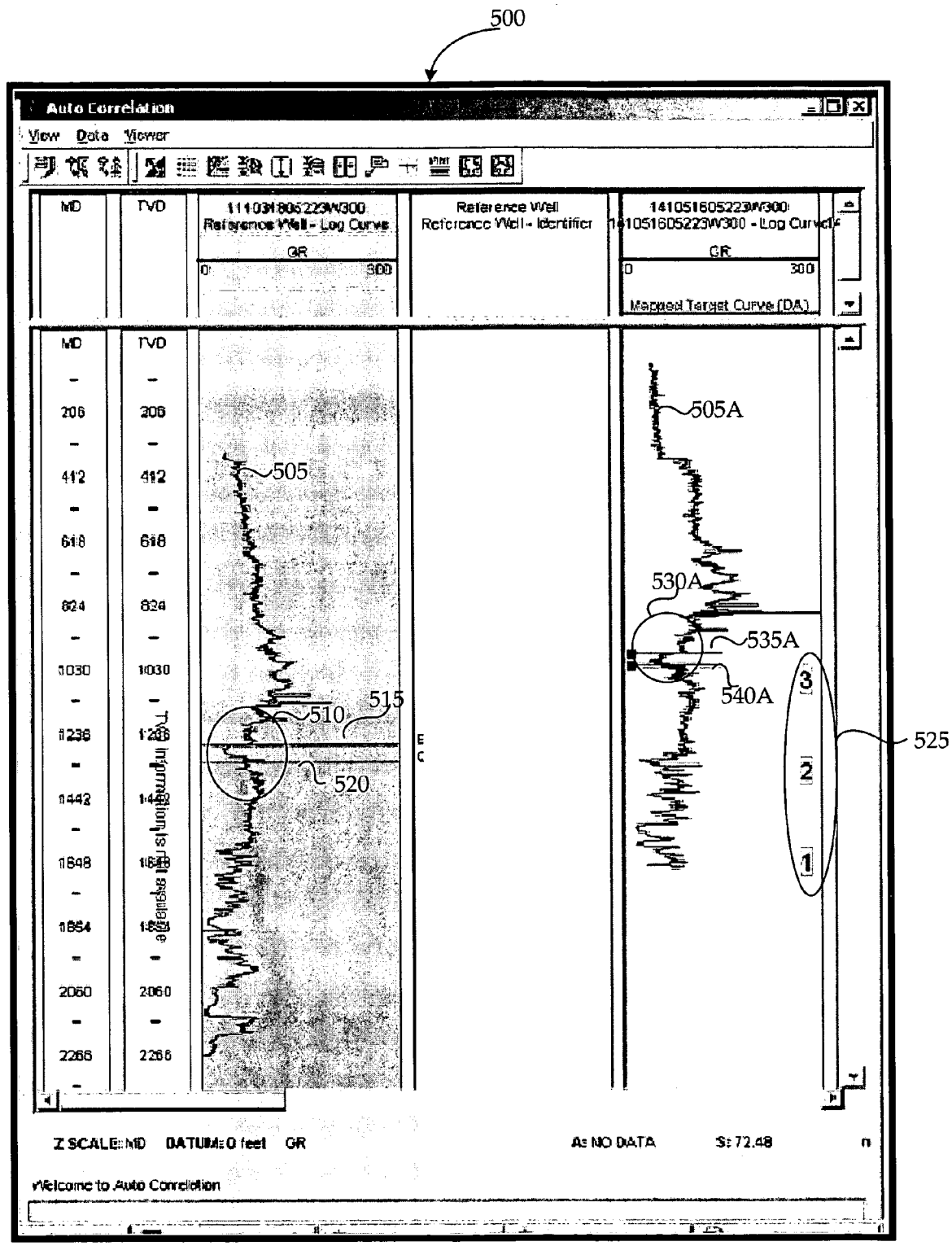
FIG. 5B shows a computer generated display of an alternative calculated solution on a target well log curve, according to an illustrative embodiment.

Referring now to FIG. 2C, the routine continues from operation 240 at operation 245 where a user of the application program 126 determines whether the displayed solution calculated at operation 215 is geologically accurate. In particular, the user may visually compare the geological signature from a reference well log curve with the solution (i.e., the mapped geological signature on a target well log curve) suggested by the application program and decide that a better solution is available. An example of a geographically inaccurate calculated solution is shown in FIG. 5. As can be seen in FIG. 5, the optimal solution 510A (i.e., the mapped geological signature) displayed on the target well log curve 505A next to the ordinal number "1" does not visually correspond to the geological signature 510 on the reference well log curve 505. If the user determines that the displayed calculated solution is not geologically accurate, the routine continues from operation 245 at operation 250 where the application program 126 allows the user to select alternative calculated solutions to determine a better geological fit. If, however, at operation 245 the user determines that the displayed calculated solution is geologically accurate, the routine branches to operation 275.

As briefly discussed above, at operation 250 the application program 126 receives a user selection of alternative calculated solutions. For instance, as shown in FIG. 5, a user may select the solution corresponding to the ordinal number "2" or alternatively, the solution corresponding to the ordinal number "3." The routine then continues from operation 250 at operation 255 where the application program 126 displays the selected alternative solutions with corresponding mapped pick locations on the target well log curve. For instance, as can be seen in FIG. 5A, the solution 530A corresponding to the ordinal number "3" has selected as being a closer fit to the geological signature 510 on the reference well log curve 505 and thus, this solution is displayed on the target well log curve 505A. At operation 255, the application program 126 also displays the mapped picked locations (e.g., the pick locations 535A and 540A shown in FIG. 5A) calculated for the user-selected solution on the target well log curve.

The routine continues from operation 255 at operation 260 where a user of the application program 126 determines whether any of the alternative calculated solutions displayed at operation 255 are is geologically accurate. If any of the alternative solutions are geologically accurate, the routine branches to operation 275. If, however, the user determines that none of the alternative solutions are geologically accurate, the routine then continues from operation 260 at operation 265 where the application program moves a mapped geological signature along a target well curve in response to user input. In particular, the application program 126 enables a user to interactively move a mapped geological signature up and down along a target well to manually determine an optimal solution. It will be appreciated that this functionality may be enabled by the dynamic programming algorithm discussed above with respect to FIG. 2A. In particular, the application program 126 may store the right side column of the cost matrix C and the full backtrack matrix B in memory. Those skilled in the art will appreciate that this stored information enables a user to recover a program solution at any ending location on the target curve. The routine then continues from operation 265 at operation 270 where the application program 126 remaps the calculated pick locations as the mapped geological signature is moved along the target well. From operation 270 the routine then ends.

Figure 6:
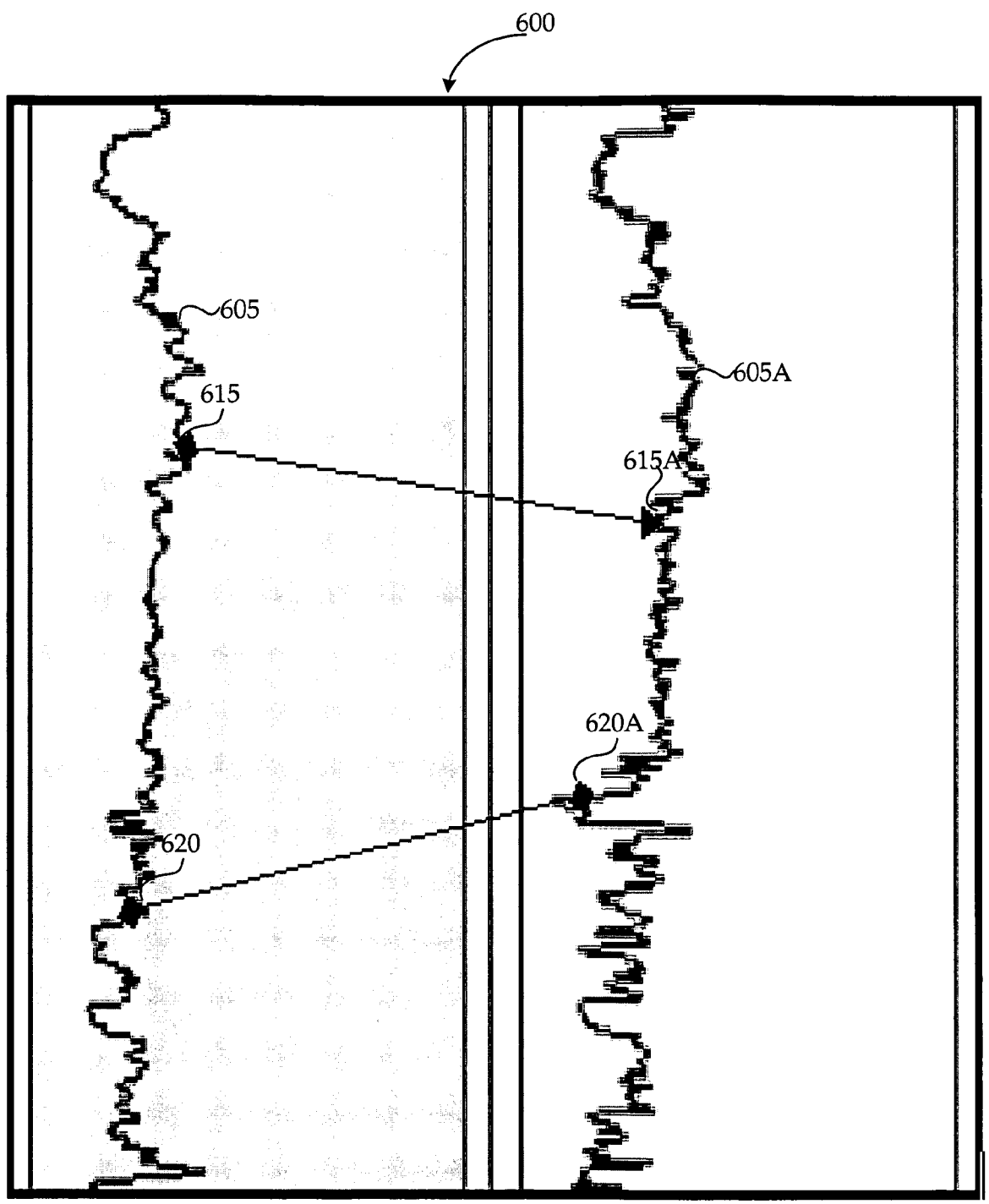
FIG. 6 shows a computer generated display of alignment markers added by a user at selected depths along the reference well and target well log curves to constrain the calculated solution along the target well log curve, according to an illustrative embodiment.

As discussed above, the routine branches from operations 245 and 260 to operation 275. At operation 275, a user of the application program 126 determines whether any of the calculated solutions displayed at operation 245 or operation 255 need to be constrained. For instance, a user may decide that a displayed calculated solution on a target well log curve is close to being geologically accurate but needs to be stretched and/or squeezed. If a user of the application program 126 determines that a calculated solution (i.e., a mapped geological signature) needs to be constrained, the user may add one or more "alignment markers" to the geological signature along the reference well and target well log curves by pointing to and clicking on one or more depths along the curves. For instance, as can be seen in FIG. 6, the geological signature 605 is shown for a reference well log curve and the mapped geological signature 605A calculated by the dynamic programming algorithm is shown for a target well log curve. Each signature includes alignment marker pairs 615, 615A and 620, 620A at selected depths along each curve.

The addition of the alignment markers forces or constrains the calculated solution to align to the selected depths resulting in the stretching and squeezing of the input or reference geological signature to follow the user's geologic interpretation. If the user determines that no constraints are need for a displayed solution, the routine then ends. If, however, the user determines that one or more constraints are needed for a displayed solution, the routine continues at operation 280 where the application program 126 receives the constraint data or selection of alignment markers from the user.

The routine then continues from operation 280 at operation 285 where the application program 126 recalculates solutions for the target well log curve based on the constraint data. It will be appreciated that the addition of constraint data to the dynamic programming algorithm creates additional subproblems to be solved. In particular, an alignment marker K breaks the original reference curve matching problem into K+1 subproblems. These additional subproblems may be solved by adding a recursive layer on top of the dynamic programming algorithm to solve subproblems independently and then "glue" the solutions back together. From operation 285 the routine then ends.

Although the present invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method of optimizing the correlation of well log data, comprising:
    identifying a geological signature in well log data from a reference well;
    identifying well log data from at least one target well;
    calculating a plurality of solutions from the reference well log data and the at least one target well log data, each of the plurality of solutions having an associated cost measure, wherein the cost measure is calculated from a matrix comprising a sum of distances between depth sampled data elements from the reference well log data and data elements comprising the at least one target well log data, the matrix having a length from left to right and a height from top to bottom, wherein the depth sampled elements comprise the geological signature; and
    displaying the solution having the least associated cost measure on the at least one target well log data as an optimal solution, wherein the optimal solution comprises a mapping of the geological signature from the reference well log data.

2. The method of claim 1 further comprising displaying indicia representing each of the calculated plurality of solutions in order of increasing cost.

3. The method of claim 1, wherein the reference well log data and the at least one target well log data are represented as curves.

4. The method of claim 3 further comprising voiding a calculated solution in the plurality of solutions which is near a starting location of a previously calculated solution on the at least one target well curve.

5. The method of claim 3 further comprising:
    identifying a set of pick locations on the geological signature from the reference well log data, the set of pick locations corresponding to a plurality of depths in the reference well;
    mapping the set of pick locations onto each of the calculated plurality of solutions; and
    displaying the mapped set of pick locations corresponding to the optimal solution on the at least one target well log data.

6. The method of claim 5 further comprising:
    displaying a selected one of the plurality of solutions on the at least one target well log data in response to a user input; and
    displaying the mapped set of pick locations corresponding to the selected one of the plurality of solutions on the at least one target well log data.

7. The method of claim 6 further comprising:
moving the selected one of the plurality of solutions along the at least one target well curve in response to the user input; and
remapping the set of pick locations as the selected one of the plurality of solutions is moved along the at least one target well curve.

8. The method of claim 1, wherein each of the plurality of solutions is calculated by determining an alignment between a connected subset of the data elements comprising the geological signature in the reference well log data and a subset of the data elements comprising the at least one target well log data.

9. The method of claim 8, wherein the alignment is determined utilizing dynamic programming.

10. The method of claim 1 further comprising receiving constraint data which forces the plurality of solutions to align a plurality of identified depths along the geological signature from the reference well to a plurality of selected depths along the mapped geological signature.

11. A computer system for optimizing the correlation of well log curves, comprising:
a display device; and
a processor configured to identify a geological signature in a well log curve from a reference well, identify a well log curve from at least one target well, calculate a plurality of solutions from the reference well log curve and the at least one target well log curve, and initiate the display of an optimal solution on the at least one target well log curve, wherein the optimal solution comprises a least cost mapping of the geological signature on the at least one target well log curve, wherein the least cost is calculated from a matrix comprising a sum of distances between depth sampled data elements from the reference well log data and data elements comprising the at least one target well log data, the matrix having a length from left to right and a height from top to bottom, wherein the depth sampled elements comprise the geological signature.

12. The computer system of claim 11, wherein the processor is further configured to initiate the display of indicia representing each of the calculated plurality of solutions in order of increasing cost, wherein each of the calculated plurality of solutions comprises a low cost mapping of the geological signature on the at least one target well curve.

13. The computer system of claim 11, wherein the processor is further configured to void a calculated solution in the plurality of solutions which is near a starting location of a previously calculated solution on the at least one target well curve.

14. The computer system of claim 11, wherein the processor is further configured to identify a set of pick locations on the geological signature from the reference well log curve, map the set of pick locations onto each of the calculated plurality of solutions, and display the mapped set of pick locations corresponding to the optimal solution on the at least one target well log curve.

15. The computer system of claim 14, wherein the processor is further configured to initiate the display of a selected one of the plurality of solutions on the at least one target well log curve in response to a user input and initiate the display of the mapped set of pick locations corresponding to the selected one of the plurality of solutions on the at least one target well log curve.

16. The computer system of claim 15, wherein the processor is further configured to move the display of The selected one of the plurality of solutions along the at least one target well curve in response to the user input and remap the set of pick locations as the selected one of the plurality of solutions is moved along the at least one target well curve.

17. The computer system of claim 11, wherein the processor calculates each of the plurality of solutions by determining an alignment between a connected subset of the data elements comprising the geological signature in the reference well log curve and a subset of the data elements comprising the at least one target well log curve.

18. The computer system of claim 11, wherein the processor is further configured to receive constraint data which forces the plurality of solutions to align a plurality of identified depths along the geological signature from the reference well to a plurality of selected depths along the mapped geological signature.

19. A computer system for optimizing the correlation of well log data, comprising:
a display device;
storage containing well log data from a reference well and well log data from at least one target well, wherein the well log data from the reference well comprises a geological signature; and
a processor configured to:
calculate a plurality of cost measures from the reference well log data and the at least one target well log data, wherein each of the plurality of cost measures is calculated from a matrix comprising a sum of distances between depth sampled data elements from the reference well log data and data elements comprising the at least one target well log data, the matrix having a length from left to right and a height from top to bottom, wherein the depth sampled elements comprise the geological signature, and determine from the plurality of cost measures a plurality of solutions having varying levels of cost, wherein each of the plurality of solutions comprises a mapping of the geological signature on the at least one target well log data; and
display via the display device at least one of the plurality of solutions having a least associated cost measure on the at least one target wall log data as an optimal solution, wherein the optimal solution comprises a mapping of the geological signature from the reference well log data.

20. The computer system of claim 19, wherein the processor is further configured to determine the optimal solution from the plurality of solutions, wherein the optimal solution has the least cost measure from the plurality of calculated cost measures.

21. The computer system of claim 19, wherein the processor calculates the plurality of cost measures by determining an alignment between a connected subset of the data elements comprising the geological signature in the reference well log data and a totality of the data elements comprising the at least one target well log data.

22. A computer readable medium containing instructions that when executed by a computer performs steps to optimize the correlation of well log data, the steps comprising:
identifying a geological signature in well log data from a reference well;
identifying well log data from at least one target well;
calculating a plurality of solutions from the reference well log data and the at least one target well log data, each of the plurality of solutions having an associated cost measure, wherein the cost measure is calculated from a matrix comprising a sum of distances between depth sampled data elements from the reference well log data and data elements comprising the at least one target well log data, the matrix having a length from left to right and a height from top to bottom, wherein the depth sampled elements comprise the geological signature;

displaying the solution having the least associated cost measure on the at least one target well log data as an optimal solution, wherein the optimal solution comprises a least mapping of the geological signature from the reference well log data; and displaying indicia representing each of the calculated plurality of solutions in order of increasing cost.

23. The computer readable medium of claim 22, wherein the reference well log data and the at least one target well log data are represented as curves.

24. The computer readable medium of claim 23 further comprising the step of voiding a calculated solution in the plurality of solutions which is near a starting location of a previously calculated solution on the at least one target well curve.

25. The computer readable medium of claim 23 further comprising the steps of:
identifying a set of pick locations on the geological signature from the reference well log data, the set of pick locations corresponding to a plurality of depths in the reference well;
mapping the set of pick locations onto each of the calculated plurality of solutions; and
displaying the mapped set of pick locations corresponding to the optimal solution on the at least one target well log data.

26. The computer readable medium of claim 25 further comprising the steps of:
displaying a selected one of the plurality of solutions on the at least one target well log data in response to a user input; and
displaying the mapped set of pick locations corresponding to the selected one of the plurality of solutions on the at least one target well log data.

27. The computer readable medium of claim 26 further comprising the steps of:
moving the selected one of the plurality of solutions along the at least one target well curve in response to the user input; and
remapping the set of pick locations as the selected one of the plurality of solutions is moved along the at least one target well curve.

28. The computer readable medium of claim 26 further comprising the step of receiving constraint data which forces the plurality of solutions to align a plurality of identified depths along the geological signature from the reference well to a plurality of selected depths along the mapped geological signature.

29. The computer readable medium of claim 22, wherein each of the, plurality of solutions is calculated by determining an alignment between a connected subset of the data elements comprising the geological signature in the reference well log data and a subset of the data elements comprising the at least one target well log data.

30. The computer readable medium of claim 29, wherein the alignment is determined utilizing dynamic programming.

* * * * *